US011217915B2

(12) United States Patent
Olszewski et al.

(10) Patent No.: US 11,217,915 B2
(45) Date of Patent: Jan. 4, 2022

(54) COMPOSITE CORE CONDUCTOR COMPRESSION CONNECTORS AND METHODS FOR USING SAME

(71) Applicant: Preformed Line Products Co., Mayfield Village, OH (US)

(72) Inventors: Jonathon Randall Olszewski, Elyria, OH (US); Przemyslaw Tomasz Krawczyk, Buczkowice (PL); Aaron Tai, Auckland (NZ)

(73) Assignee: PREFORMED LINE PRODUCTS CO., Mayfield Village, OH (US)

(*) Notice: Subject to any disclaimer, the term of this patent is extended or adjusted under 35 U.S.C. 154(b) by 0 days.

(21) Appl. No.: 16/446,158

(22) Filed: Jun. 19, 2019

(65) Prior Publication Data

US 2019/0386410 A1    Dec. 19, 2019

Related U.S. Application Data

(60) Provisional application No. 62/687,240, filed on Jun. 19, 2018.

(51) Int. Cl.
| | |
|---|---|
| *H01R 11/14* | (2006.01) |
| *H01R 4/10* | (2006.01) |
| *H01R 43/04* | (2006.01) |
| *H01R 4/60* | (2006.01) |
| *H01R 4/62* | (2006.01) |
| *H01R 11/32* | (2006.01) |

(52) U.S. Cl.
CPC .............. *H01R 11/14* (2013.01); *H01R 4/10* (2013.01); *H01R 4/60* (2013.01); *H01R 43/04* (2013.01); *H01R 4/62* (2013.01); *H01R 11/32* (2013.01)

(58) Field of Classification Search
CPC . H01R 11/14; H01R 4/10; H01R 4/60; H01R 4/62; H01R 11/32; H01R 43/04
See application file for complete search history.

(56) References Cited

U.S. PATENT DOCUMENTS

| | | | |
|---|---|---|---|
| 5,863,292 A * | 1/1999 | Tosic | A61B 17/62 606/56 |
| 6,805,596 B2 | 10/2004 | Quesnel et al. | |
| 7,041,909 B2 | 5/2006 | Hiel et al. | |
| 7,043,833 B2 | 5/2006 | Ditroia | |
| 7,342,175 B2 | 3/2008 | De France | |
| 7,385,138 B2 | 6/2008 | De France et al. | |
| 7,435,144 B2 | 10/2008 | Waltz | |
| 7,563,983 B2 | 7/2009 | Bryant | |
| 7,575,485 B2 | 8/2009 | Waltz et al. | |

(Continued)

*Primary Examiner* — Truc T Nguyen
(74) *Attorney, Agent, or Firm* — Cooper Legal Group, LLC

(57) ABSTRACT

An electrical connector includes a compression device defining an aperture and is configured to receive a first portion of a base row of wires and a first portion of a core of an electrical conductor within the aperture. An outer tube defines a central through hole and is configured to receive the compression device within the central through hole. A first end of the outer tube is configured to be compressed around the first end of the compression device, and a first portion of the core of the associated electrical conductor to create a compressed assembly. The compressed assembly is contiguous with a second portion of the base row of wires and a second portion of the core of the associated electrical conductor.

20 Claims, 9 Drawing Sheets

(56) References Cited

U.S. PATENT DOCUMENTS

| | | | |
|---|---|---|---|
| 7,607,954 B2 | 10/2009 | Byrne et al. | |
| 7,608,783 B2 | 10/2009 | Bryant et al. | |
| 8,167,665 B2 * | 5/2012 | De France | H01R 4/20 439/783 |
| 8,353,717 B2 | 1/2013 | Chadbourne | |
| 8,664,529 B2 | 3/2014 | Wang et al. | |
| 8,777,679 B2 * | 7/2014 | De France | H01R 4/20 439/879 |
| 8,895,856 B2 * | 11/2014 | McCullough | F16G 11/02 174/75 R |
| 9,166,303 B2 * | 10/2015 | Khansa | H01R 4/203 |
| 9,257,760 B2 * | 2/2016 | Crutcher | H01R 4/5025 |
| 9,397,461 B2 * | 7/2016 | De France | H01R 43/048 |
| 9,748,670 B1 * | 8/2017 | Quesnel | H01R 4/203 |
| 10,594,054 B2 * | 3/2020 | Murugiah | H01R 43/26 |
| 10,700,504 B2 * | 6/2020 | Nakamura | H02G 7/02 |
| 10,833,498 B2 * | 11/2020 | Nakamura | H02G 1/02 |
| 10,931,091 B2 * | 2/2021 | Chan | H01R 4/62 |
| 10,957,994 B2 * | 3/2021 | Johnson | H01R 43/26 |

* cited by examiner

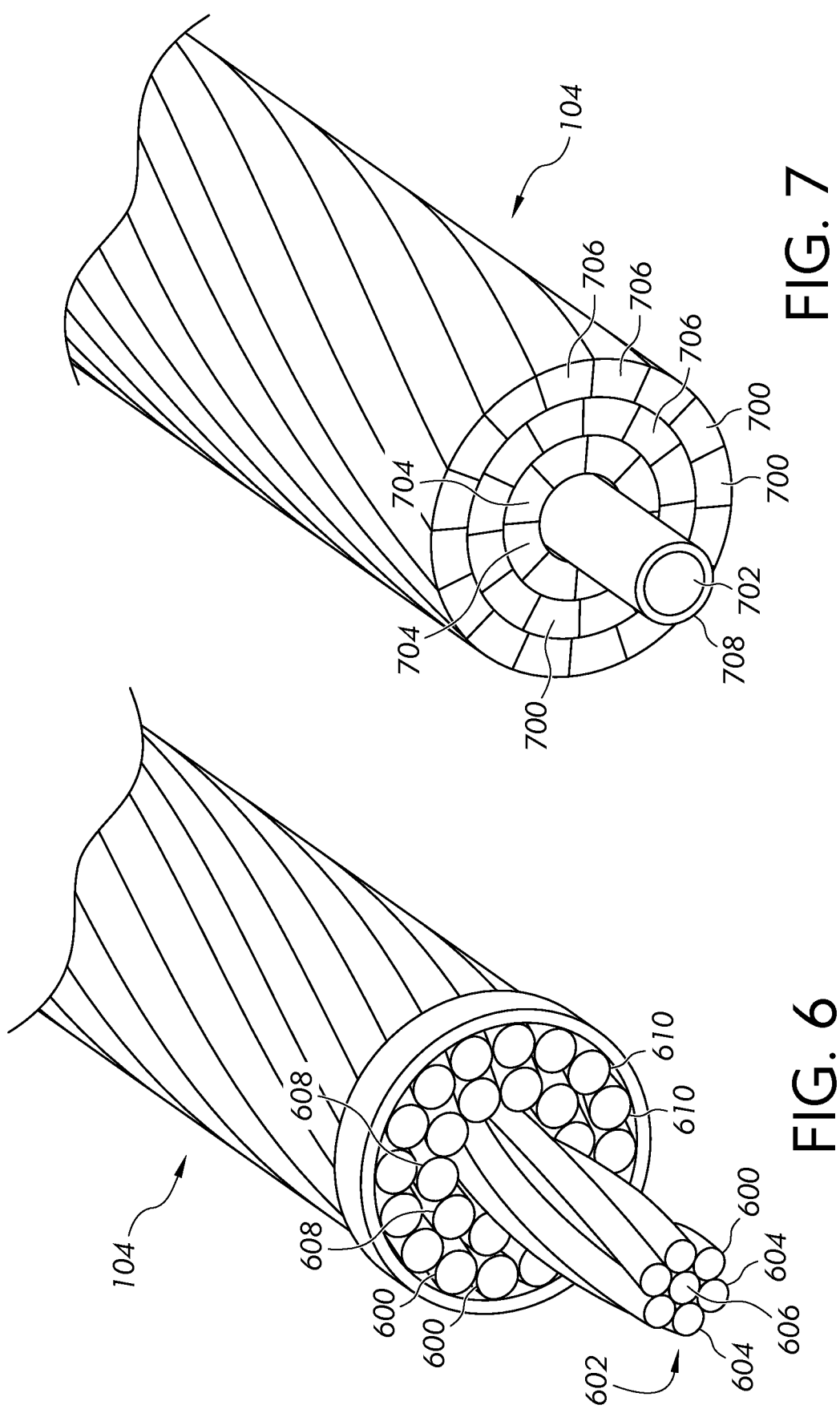

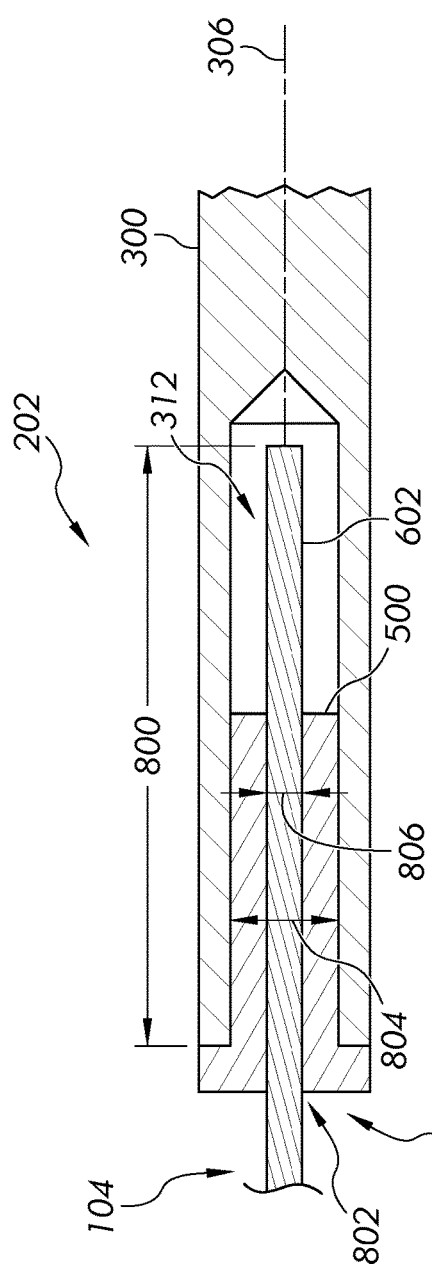
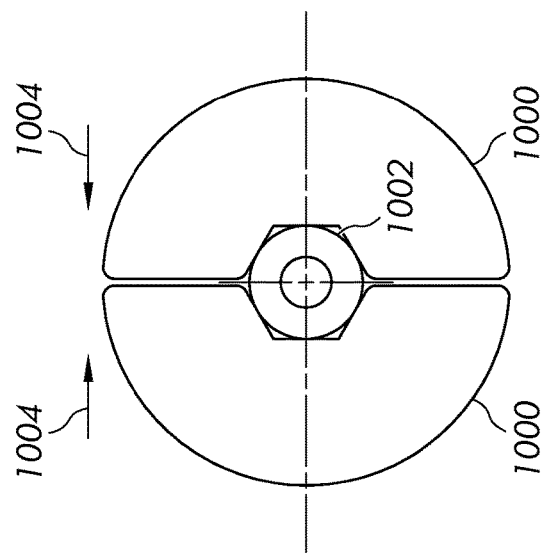
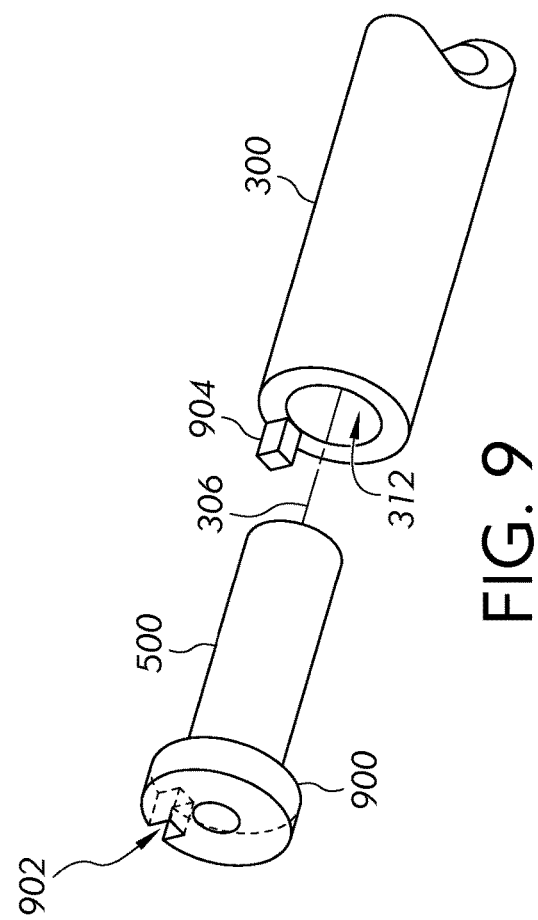
FIG. 8
FIG. 9
FIG. 10

COMPOSITE CORE CONDUCTOR COMPRESSION CONNECTORS AND METHODS FOR USING SAME

CROSS REFERENCE TO RELATED APPLICATIONS

This application claims priority to U.S. Provisional Patent Application No. 62/687,240, filed on Jun. 19, 2018, entitled "COMPOSITE CORE CONDUCTOR COMPRESSION CONNECTORS AND METHODS FOR USING SAME," which is hereby incorporated by reference herein.

TECHNICAL FIELD

The instant application is generally directed towards an electrical connector or a dead-end connector. For example, the instant application is directed towards a dead-end connector that uses a base row of wires within a compressed assembly.

BACKGROUND

Support devices, such as dead-ends, can be used in an overhead power line environment to support a cable with respect to a tower, pole, or the like. The cable comprises an electrical conductive portion and an insulating portion.

SUMMARY

This summary is provided to introduce a selection of concepts in a simplified form that are further described below in the detailed description. This summary is not intended to identify key factors or essential features of the claimed subject matter, nor is it intended to be used to limit the scope of the claimed subject matter.

According to some embodiments, an electrical connector includes a compression device extending along a compression device axis between a first end and a second end. The first end defines an aperture and is configured to receive a first portion of a base row of wires and a first portion of a core of an associated electrical conductor within the aperture. The electrical conductor also includes an outer tube extending along an outer tube axis between a first end and a second end. The outer tube defines a central through hole and is configured to receive the compression device within the central through hole. The first end of the outer tube is configured to be compressed around the first end of the compression device, the first portion of the base row of wires, and the first portion of the core of the associated electrical conductor to create a compressed assembly. The compressed assembly is contiguous with a second portion of the base row of wires and a second portion of the core of the associated electrical conductor.

According to some embodiments, a method of making a compression connector assembly using an electrical connector includes inserting the compression device into the central through hole of the outer tube. The method also includes removing a length of a top wire row from an end of the associated electrical conductor to expose the first portion of the core and the first portion of the base row of wires at the end of the associated electrical conductor. The method further includes inserting the first portion of the core and the first portion of the base row of wires into the aperture of the compression device. The method still further includes applying a radial compression force to a length of the first end of the outer tube in order to radially compress the outer tube, the compression device, first portion of the core, and the first portion of the base row of wires such that the outer tube, the compression device, the base row of wires, and the core form a unified group such that the associated electrical conductor cannot be removed from the outer tube and the compression device.

According to some embodiments, an electrical connector includes a compression device extending from a first end to a second end along a compression device central axis. The first end includes an outside diameter and the first end defining a first aperture having an inside diameter. The second end is opposite the first end, the second end includes an outside diameter and the second end defining a second aperture, the second aperture having an inside diameter and the second aperture inside diameter is less than the first end outside diameter. The compression device includes a first composition material. The electrical connector also includes an annular cylinder, the cylinder defining a longitudinal passage such that the cylinder has a cylinder outside diameter and a cylinder inside diameter. The cylinder outside diameter is configured to enable placement of the annular cylinder inside the aperture of the compression device. The cylinder inside diameter is configured to enable placement of a core of an associated extruded electrical conductor within the cylinder. The annular cylinder outside diameter further defining longitudinal grooves along an axial length of the cylinder. The annular cylinder includes a second composition material. The electrical connector further includes an outer tube extending along an outer tube central axis. The outer tube defining a central through hole, the central through hole configured to allow a portion of the compression device to be placed within the outer tube. A length of the outer tube is configured to be compressed around the first end, the annular cylinder, and a core of the associated extruded electrical conductor to form a compressed assembly such that the first composition material and the second composition material extrude axially at different rates. The compressed assembly locks the associated extruded electrical conductor within the compression device such that the compression device supports an electrical conductor between electrical support devices.

According to some embodiments, an electrical connector includes a compressed assembly including a first portion of a core of an associated electrical conductor received within a longitudinal passage defined within an annular cylinder which is then received within an aperture defined within a first end of a compression device that extends along a compression device axis between the first end and a second end. The first portion of the core is contiguous with a second portion of the core, and an annular cylinder outside diameter further defining longitudinal grooves along an axial length of the cylinder.

According to some embodiments, an electrical connector includes a compression device extending from a first end to a second end along a compression device central axis. The first end includes an outside diameter, and the first end defining a first aperture, the first aperture is defined by an inside diameter. The second end is opposite the first end, the second end includes an outside diameter, and the second end defining a second aperture, the second aperture is defined by an inside diameter and the second aperture inside diameter is less than the first end outside diameter. The compression device includes a first composition material. The electrical connector also includes an inner annular cylinder, the cylinder defining a longitudinal passage such that the cylinder has a cylinder outside diameter and a cylinder inside diameter. The cylinder outside diameter is configured to enable placement of the cylinder inside the aperture of the compression device, and the cylinder inside diameter is configured to enable placement of a core of an associated extruded electrical conductor within the cylinder. The cylinder comprises a helical arrangement of extruded material. The cylinder comprises a second composition material. The electrical connector further includes an outer tube extending along an outer tube central axis, the outer tube defining a central through hole. The central through hole configured to allow a portion of the compression device to be placed within the outer tube. A length of the outer tube is configured to be compressed around the first end, the cylinder, and a core of the associated extruded electrical conductor to form a compressed assembly such that the first composition material and the second composition material extrude axially at different rates. The compressed assembly locks the associated extruded electrical conductor within the compression device such that the compression device supports an electrical conductor between electrical support devices.

The following description and annexed drawings set forth certain illustrative aspects and implementations. These are indicative of but a few of the various ways in which one or more aspects can be employed. Other aspects, advantages, and/or novel features of the disclosure will become apparent from the following detailed description when considered in conjunction with the annexed drawings.

DESCRIPTION OF THE DRAWINGS

FIG. 6 is an end detail view of an electrical conductor having a helical arrangement of wire strands used with the electrical connector of FIG. 1;

FIG. 7 is an end detail view of an electrical conductor having a helical arrangement of trapezoidal strands used with the electrical connector of FIG. 1;

FIG. 8 is a cross-section view of an electrical connector;

FIG. 9 is a detail view of a compression device having a clocking feature;

FIG. 10 is an end view of a compression tool compressing a portion of the electrical conductor;

DETAILED DESCRIPTION

Figure 1:
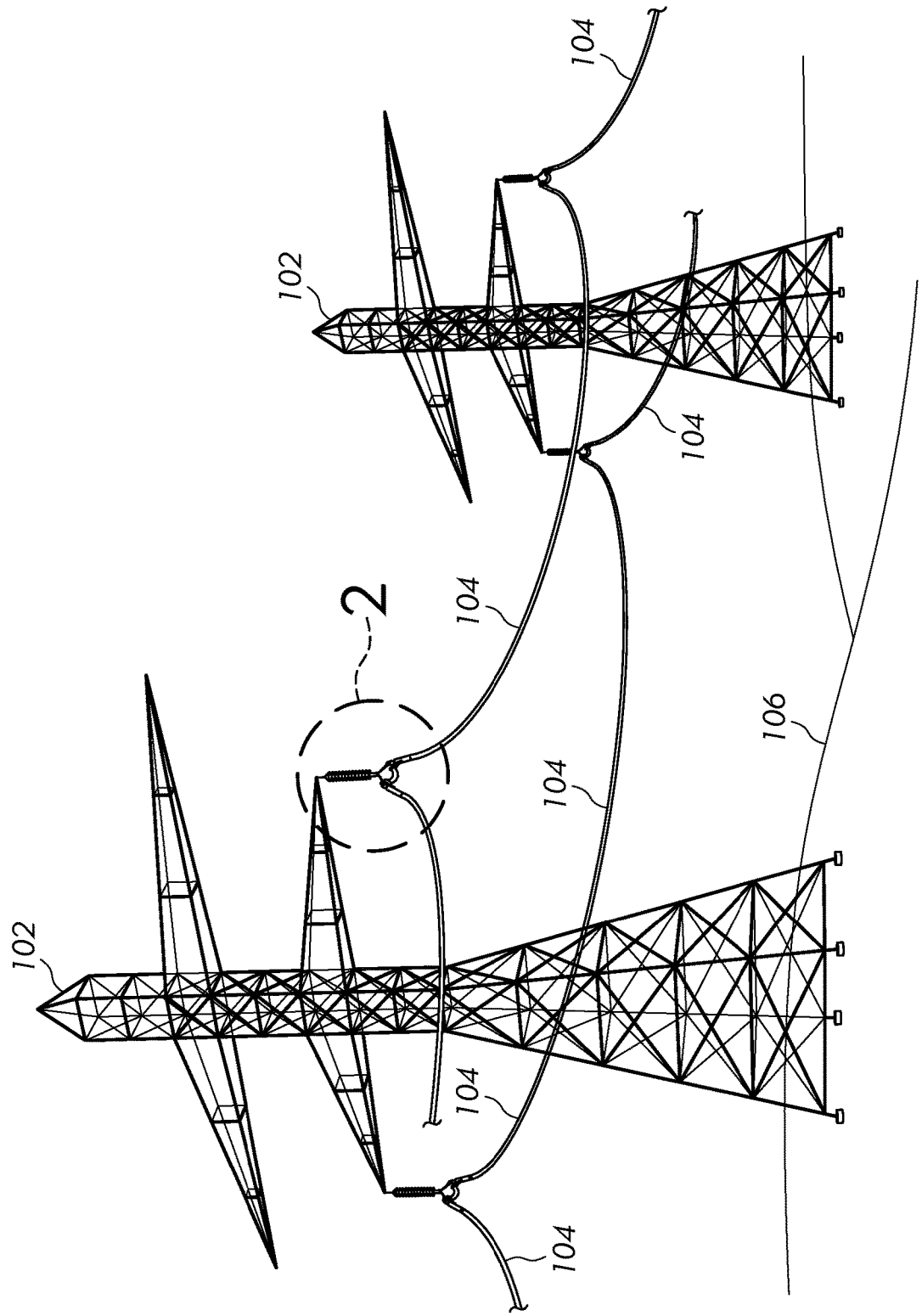
FIG. 1 is an illustration of an electrical connector supporting electrical conductors from towers in an electrical distribution system.

The claimed subject matter is now described with reference to the drawings, wherein like reference numerals are generally used to refer to like elements throughout. In the following description, for purposes of explanation, numerous specific details are set forth in order to provide an understanding of the claimed subject matter. It is evident, however, that the claimed subject matter can be practiced without these specific details. In other instances, structures and devices are illustrated in block diagram form in order to facilitate describing the claimed subject matter. Relative size, orientation, etc. of parts, components, etc. may differ from that which is illustrated while not falling outside of the scope of the claimed subject matter.

Referring now to FIG. 1, a schematic view of a portion of an exemplary high voltage power electrical distribution system 100 is shown. The distribution system 100 as shown includes electrical support devices 102 (e.g., towers), however, any suitable support devices or structures can be used with the subject matter of the present disclosure. The towers are engineered and built to keep one or more electrical conductors 104 a desired separation distance from obstacles on the ground 106. The minimum separation distance is intended to be maintained throughout various conditions such as windstorms, high heat causing conductor sagging, high electrical demand times, etc. As is to be expected, there is a periodic need to connect the ends of electrical conductors 104 at their termination points to maintain an electrical circuit. The electrical distribution system 100 distribution enables transmission of electrical energy across relatively large distances.

Figure 2:
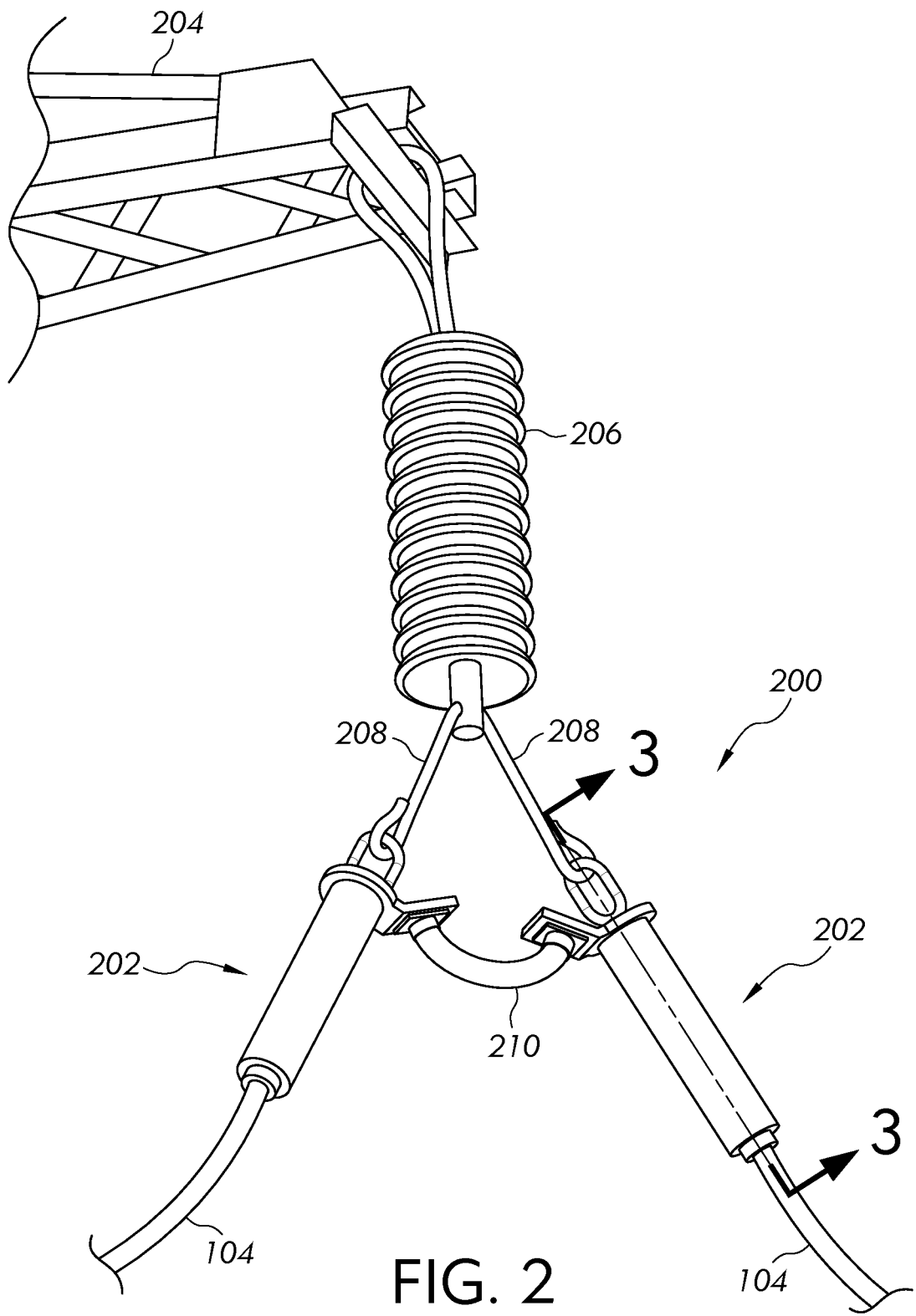
FIG. 2 is a detail view of the electrical connector from FIG. 1.

Referring to FIG. 2, an example termination point 200 is shown where the electrical conductors 104 are connected to (e.g., placed into electrical communication with) one another through an exemplary electrical connector 202. In the shown example, an arm 204 extends from a main portion of the tower 102 (shown in FIG. 1), and supports an electrically insulating device 206. A lower portion of the electrically insulating device 206 can include structure 208 to support one or more electrical connectors 202. A jumper 210 can be provided to enable electrical communication between each of the electrical connectors 202, thus providing electrical communication between each of the electrical conductors 104. Similar to FIG. 1, the shown example of the arm 204, the electrically insulating device 206, the structure 208, and the jumper 210 are merely examples, and any suitable substitute structures can be used in conjunction with the present disclosure.

Figure 3:
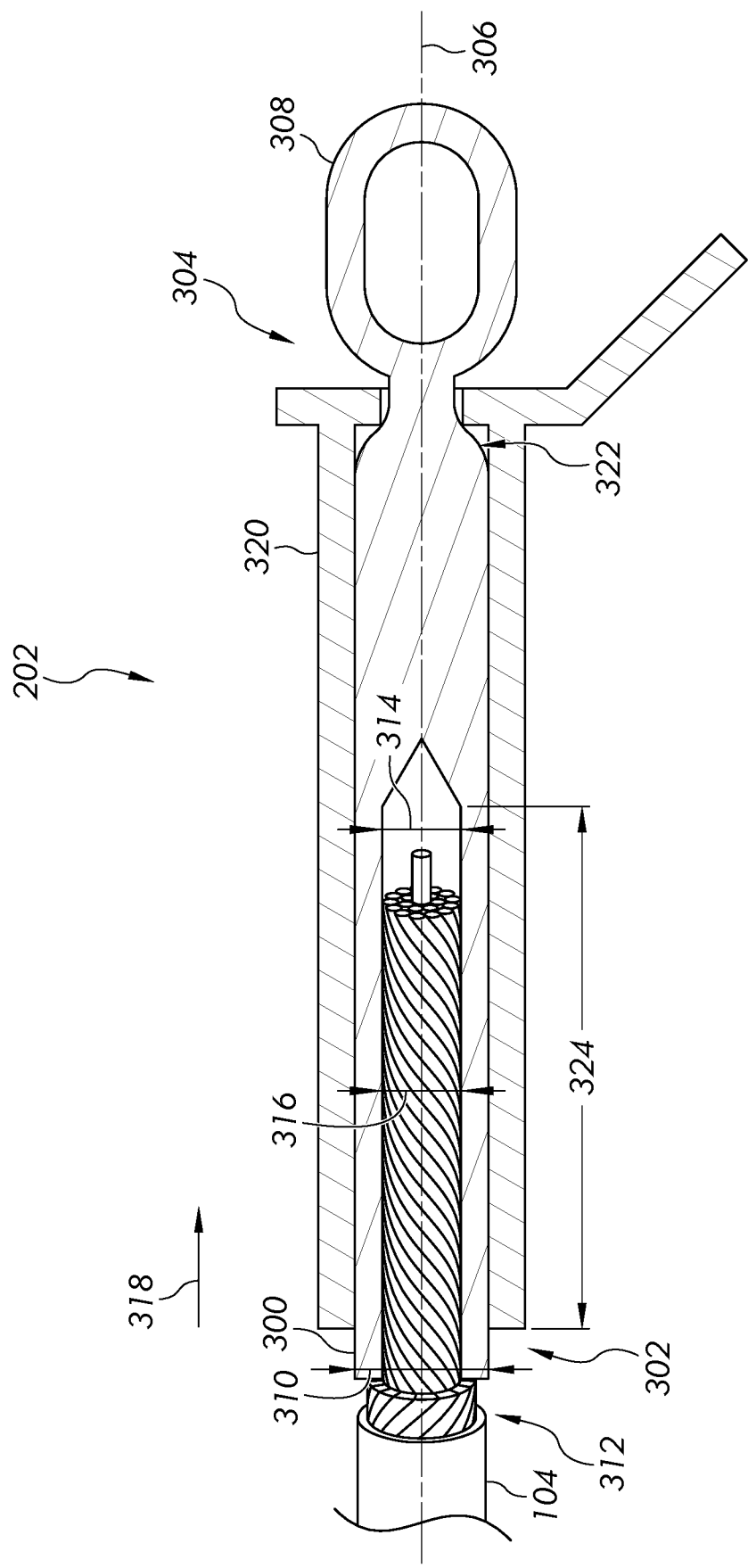
FIG. 3 is a cross-section view of the electrical connector from FIG. 2, taken along line 3-3.

Referring to FIG. 3, a cross-section view of the electrical connector 202 is shown. The electrical connector 202 can also be termed a dead-end connector or a dead-end clamp, among other similar names that are known to one having skill in the art. The electrical connector 202 includes a compression device 300 that extends from a first end 302 to a second end 304 along a compression device central axis 306. The compression device 300 can be made of any suitable material that can withstand the physical and electrical requirements of typical electrical components in electrical distribution systems, yet provide reliable and repeatable results during compression operations as will be discussed below. In some examples, the compression device 300 is constructed of steel.

The second end 304 can include a loop, an eye 308, or an eyelet device used to connect the compression device to a support tower 102 (shown in FIG. 1) or similar electrical conductor support devices.

The first end 302 includes an outside diameter 310, and it also defines an aperture 312. the aperture 312 is defined by an inside diameter 314, and the inside diameter 314 of the aperture 312 is less than the outside diameter 310 of the first end 302. The aperture 312 is configured to accept a portion of an electrical conductor 104. Appropriate properties of the electrical conductor 104 will be discussed below. In some examples, the aperture 312 is a blind aperture, meaning that it is open to one end (i.e., the first end 302) and there is no opening at the opposite end (e.g., the second end 304 of the aperture 312. In another example, a center line of the aperture 312 is colinear with the central axis 306 of the compression device 300.

Figure 4:
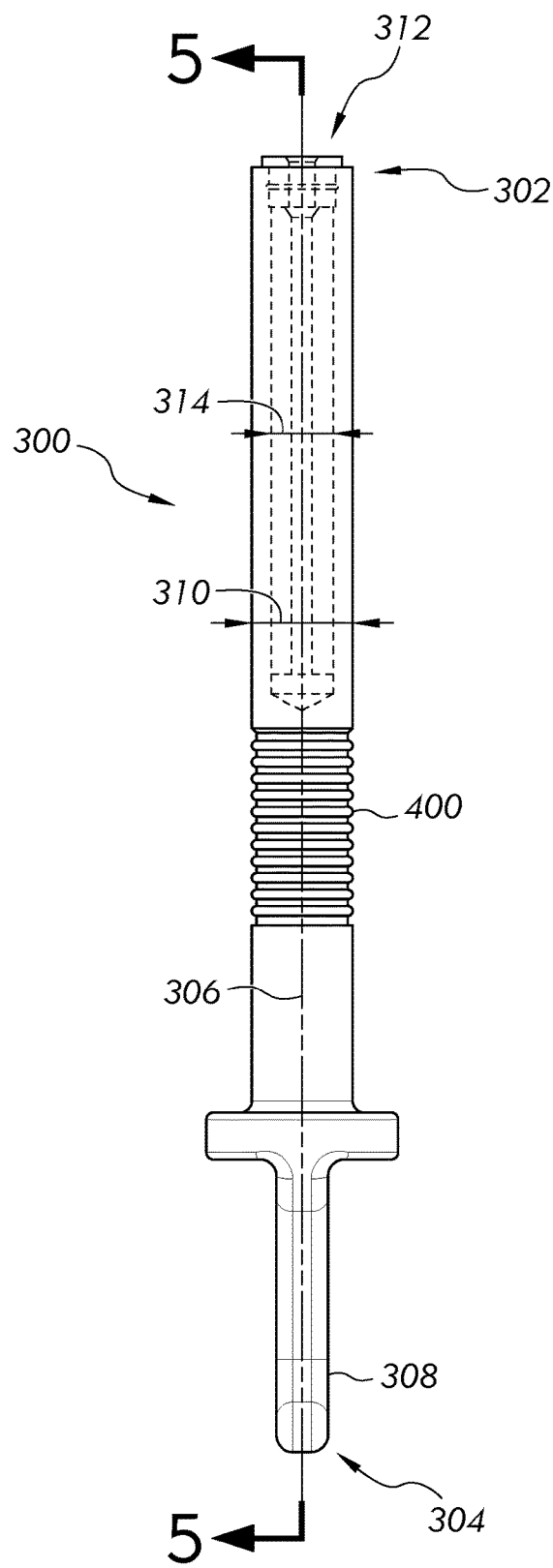
FIG. 4 is a side view of a compression device of the electrical connector from FIG. 1.

Referring to FIG. 4, a side view of the compression device 300 is shown. The compression device 300 can include a portion having surface features 400 that can include, but are not limited to, circumferential ridges, threads, etc. The surface features 400, can be designed and manufactured to tailor mechanical properties of attachment of the compression device 300 to another structure such as an outer tube that will be described below.

Figure 5:
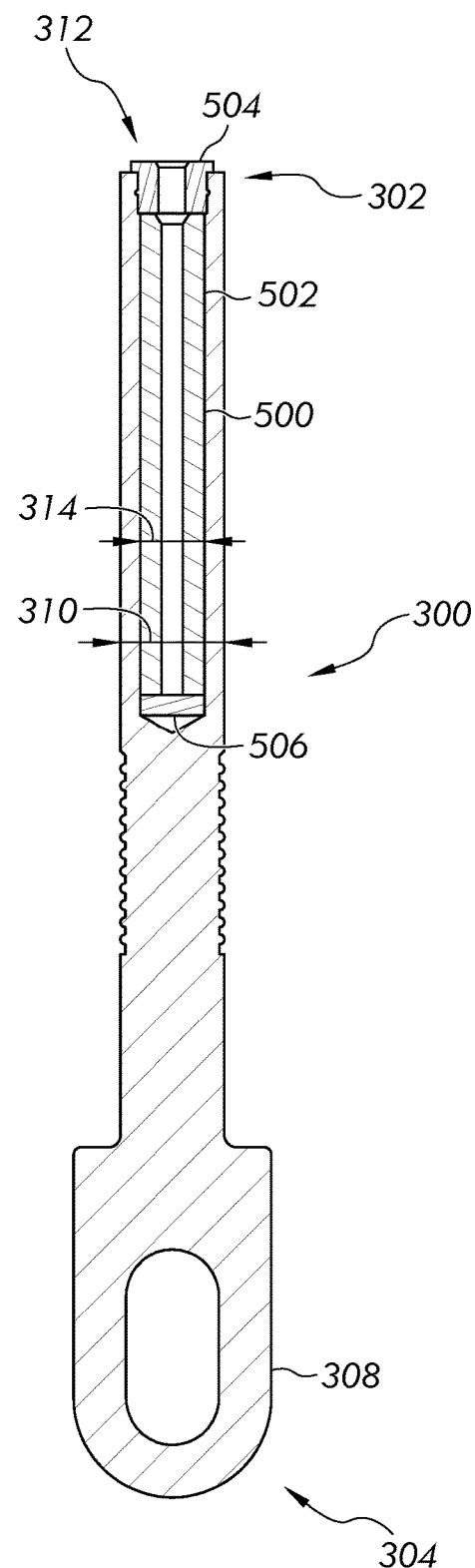
FIG. 5 is a cross-section view of the compression device of FIG. 4 taken along line 5-5.

Referring to FIG. 5, a cross-section view of the compression device 300 is shown. In this example, and that of the compression device 300 in FIG. 4, an insert 500 can be located within the aperture 312. As with the surface features 400, the insert 500 can be designed and manufactured to tailor mechanical properties of extrusion and compression of the insert 500, the compression device 300, and the electrical conductor 104 during a compression operation that will be discussed below. While not necessary, the insert 500 can include more than one section, for example, the insert body 502, the insert cap 504, and the insert end 506. The insert 500 can also provide reliable and repeatable positive location of the electrical conductor 104 when the electrical conductor 104 is located within the aperture 312 prior to the compression operation.

Referring to FIG. 6, a termination point of an example electrical conductor 104 is shown. This particular electrical conductor 104 is a conductor having circular cross-section wires 600 or strands. This conductor, as is typical of many other conductors, includes a core 602 that is engineered to support the weight of the electrical conductor 104 as it hangs from distant support devices 102 (e.g., towers) in an electrical distribution system 100. In some examples, the core 602 includes seven strands of steel; six strands 604 surrounding one central strand 606.

A base row 608 of wires surrounds the core 602 and provides flexibility and protection for the core 602 while carrying a relatively small amount of electricity that passes through the electrical conductor 104. A top row 610 or rows typically carry the majority of the electricity, and the top row 610 surrounds the base row 608. Each of the wires or strands of the top row 610 and the base row 608 can be constructed of any suitable material. In some examples, the wires or strands are composed of aluminum. In some examples, the compression device 300 comprises a material having a hardness that is greater than a hardness of the base row 608 of wires. In some examples, the compression device 300 is constructed of steel. The Referring to FIG. 7, the electrical conductor 104 is a conductor having trapezoidal circular cross-section wires 700 or strands. This type of conductor also includes a core 702 (e.g., a carbon core is shown), a base row 704, and a top row 706 or rows. In some examples, the core 702 can include a sheath 708. The shown example electrical conductor 104 including the trapezoidal wire 700 or strands can be beneficial in that there is less volume of space between the wires or strands (e.g., spaces between wires 700 in FIG. 7 versus wires 600 in FIG. 6), and the alignment of the wires 700 or strands is well-established without significant movement between the individual wires 700 or strands during a compression operation. Both the circular and the trapezoidal wires 600, 700 or strands can be produced through an aluminum extrusion process.

In some examples, as the one shown in FIG. 7, the core 702 is composed of carbon fibers. At times, the carbon fibers can include several strands, such as the steel example described in relation to the example shown in FIG. 6. In other examples, the carbon fiber can be a larger diameter, single-strand core 702.

The examples of FIGS. 6 and 7 both show a termination point of an example electrical conductor 104 where a portion of an exterior sheath (shown in FIG. 3) has been removed, and a portion of the top row(s) 610, 706 and the base row 608, 704 have been shortened in order to expose the core 602, 702 that will be placed in the aperture 312 of the compression device 300 in order to permanently attach the electrical conductor 104 to the compression device 300 in a compression operation.

Returning to FIG. 3, the inside diameter 314 approximates an outside diameter 316 of a base row of wires of the electrical conductor 104. This relationship between the inside diameter 314 and the outside diameter 316 enables the base row of wires to be relatively easily inserted in an axial direction (represented by arrow 318) to the aperture 312. In some examples, the inside diameter 314 can define a circular profile, but other cross-sectional profiles are also contemplated, such as an ovoid cross-section. The inside diameter 314 term is not meant to be limiting to a circular or cylindrical aperture.

The electrical connector 202 also includes an outer tube 320 having an outer tube central axis that can be colinear with the compression device central axis 306. The outer tube 320 defines a central through hole 322 configured to allow a portion of the compression device 300 to be placed within the outer tube 320. The outer tube 320 and the compression device 300 can be connected in any suitable manner. In some examples, the outer tube 320 and the compression device 300 are connected through a threaded connection.

It is worthy of note that the example electrical connector 202 shown in FIG. 3 does not include the insert 500 as shown in FIG. 5. In some examples, the insert 500 is beneficial to include, and the present disclosure can include examples of electrical connectors 202 with inserts 500 and without inserts 500. In some examples, the insert 500 is used in electrical connectors 202 that use only the core 602 within the compression zone for the compression device 300. In other examples, the insert 500 is not used in electrical connectors 202 that use the core 602 and the base row 608 of the electrical conductor 104.

Remaining with FIG. 3, a length 324 of the compression device 300 is configured to be compressed around the first end 302, the base row 608 of wires, and a core 602 of the associated electrical conductor 104 such that the compressed assembly locks the associated electrical conductor 104 within the compression device 300 such that the compression device 300 supports the electrical conductor 104 between electrical support devices 102. In other examples, the associated electrical conductor 104 is unable to be physically removed from the electrical connector 202. In yet other examples, the outer diameter 316 and the inner diameter 314 have a particular ratio or relationship that fosters a proper compression result.

Referring to FIG. 8, a length 800 of the compression device 300 is configured to be compressed around the insert 500 and the core 602 of the electrical conductor 104 such that the compressed assembly locks the associated electrical conductor 104 within the compression device 300 such that the compression device 300 supports the electrical conductor 104 between electrical support devices 102. In other examples, the associated electrical conductor 104 is unable to be physically removed from the electrical connector 202.

In examples as represented in FIG. 8, the electrical connector 202 includes the compression device 300 centered about the compression device central axis 306. The compression device 300 includes the first end 302 defining an aperture 312. The aperture is defined by an inside diameter 314. The compression device 300 comprises a first composition material. In some examples, the first composition material is steel.

The electrical connector 202 can also include an inner annular cylinder (e.g., insert 500), the cylinder defining a longitudinal passage 802 such that the cylinder has a cylinder outside diameter 804 and a cylinder inside diameter 806. The cylinder outside diameter 804 is configured to enable placement of the cylinder inside the aperture 312 of the compression device 300. The cylinder inside diameter 806 is configured to enable placement of the core 602 of the associated electrical conductor 104 within the cylinder. The cylinder comprises a second composition material, for example, aluminum.

The electrical connector 202 of FIG. 8 can also include an outer tube 320 as shown in FIG. 3 extending along an outer tube central axis that can be colinear with the compression device central axis 306. The outer tube 320 defining a central through hole 322, the central through hole 322 configured to allow a portion of the compression device 300 to be placed within the outer tube 320. Similar to the previous embodiment, a length of the outer tube 320 is configured to be compressed around the first end 302, the insert 500, and the core 602 of the associated electrical conductor 104 to form a compressed assembly such that the first composition material and the second composition material extrude axially at different rates. Additionally, the compressed assembly locks the associated electrical conductor 104 within the compression device 300 such that the compression device 300 supports the electrical conductor 104 between electrical support devices 102 and/or the electrical conductor 104 cannot be removed from the compressed assembly.

Referring to FIG. 9, the cylinder (e.g., insert 500) can further include a shoulder 900, the shoulder 900 is configured to cooperate with the compression device 300 to limit the length of the cylinder that can pass into the aperture 312. Additionally, the cylinder can be clocked with the aperture 312. In some examples, the shoulder 900 can define a void 902 that cooperates with a tab 904 on the compression device 300 to reduce or eliminate angular rotation of the cylinder about the axis 306. In this way, the cylinder can be positively located with respect to a rotational location within the aperture 312.

Referring to FIG. 10, an example set of jaws 1000 are shown surrounding a set of concentric circles 1002. The circles represent an end view (e.g., from the first end 302) of the electrical connector 202. Any of the previously described embodiments of electrical connectors 202 are intended to be represented in FIG. 10. The jaws 1000 are forced together in the direction of arrows 1004 to compress the compression area of the electrical connector 202 onto the electrical conductor 104 to lock them together. As shown in FIG. 10, the interior portion of the jaws are hexagonal in shape, and this is not intended to be limiting.

Figure 11:
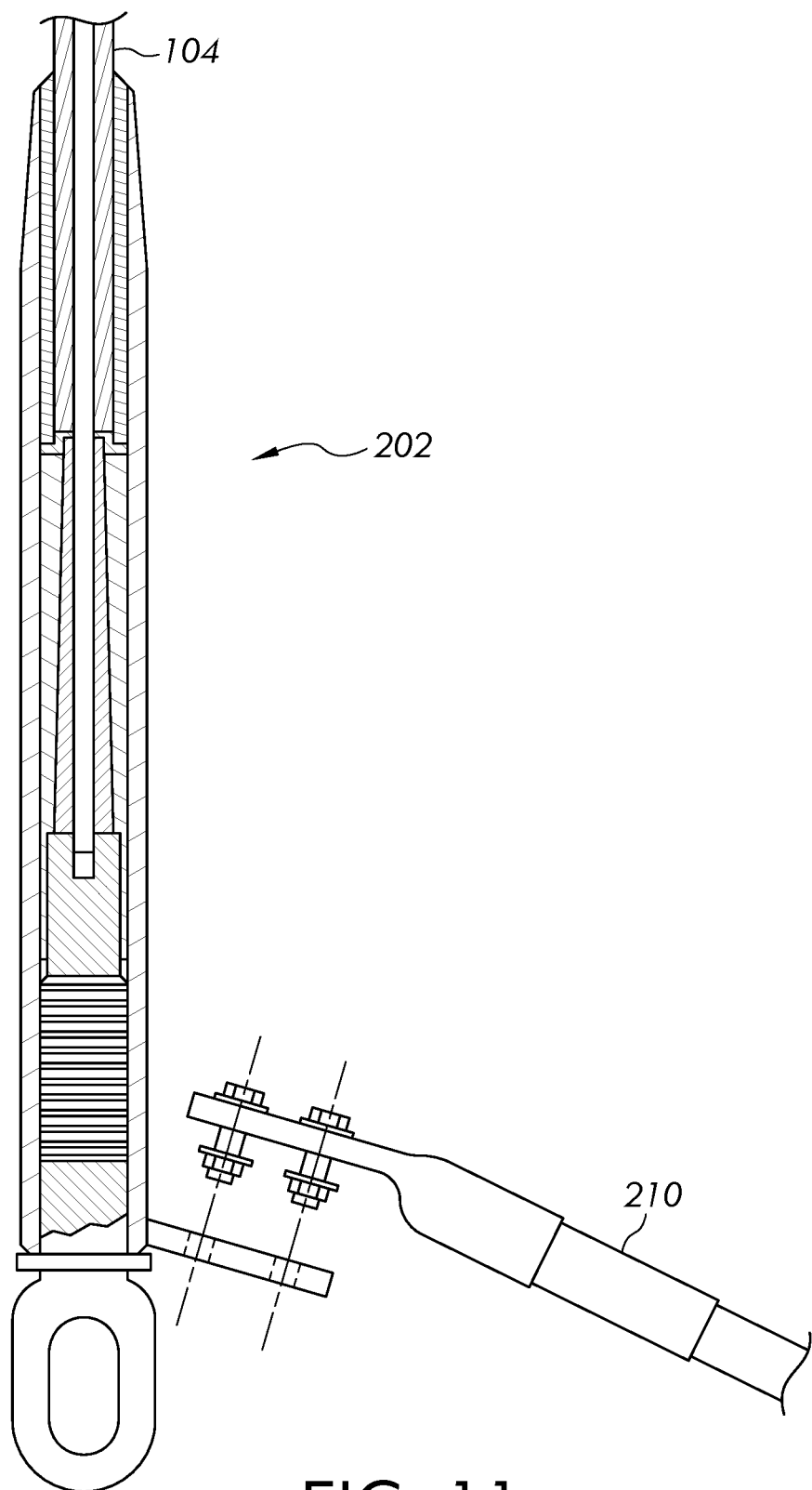
FIG. 11 is a partial cross section view of the electrical connector of FIG. 2, taken along line 3-3.

Referring to FIG. 11, a compressed assembly of the electrical connector 202 is shown taken along line 3-3 of FIG. 2. The electrical connector 202 is shown with an associated jumper 210 that provides electrical communication to the next electrical conductor 104.

Figure 12:
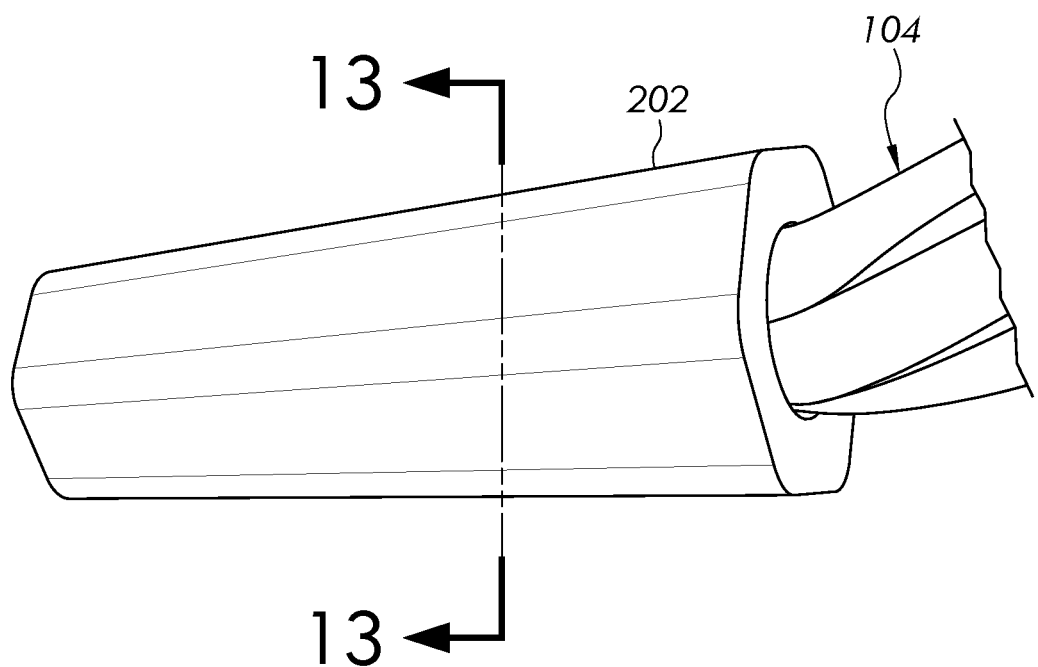
FIG. 12 is a view of a portion of a compressed electrical connector about an electrical conductor.

Referring to FIG. 12, a perspective view of a portion of a compressed electrical connector 202 is shown. The electrical connector 202 has been compressed to form an unbreakable bond with the electrical conductor 104. The outside surface of the electrical connector 202 is shown in hexagonal form, matching the interior surfaces of the jaws of the compression device shown in FIG. 10. Other shapes are also contemplated.

Figure 13:
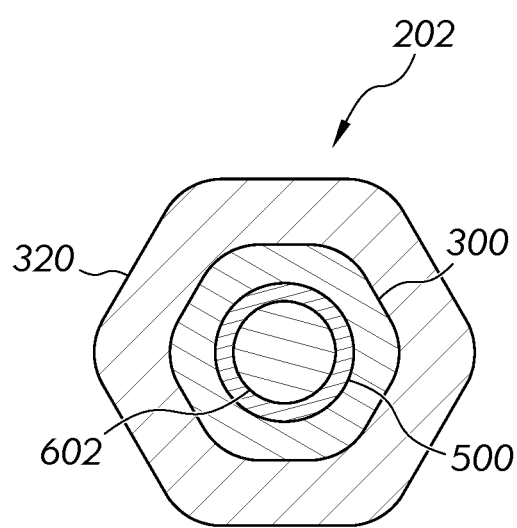
FIG. 13 is a cross-section view of the compressed compression device of FIG. 12.

Referring to FIG. 13, a cross-section view of the compressed electrical connector 202 is shown. The outer tube 320 surrounds and is compressed into the compression device 300 which surrounds and is compressed into the insert 500 which surrounds and is compressed into the core 602. Of course, in some examples, the insert 500 layer shown in FIG. 13 could be replaced by the base row 608 of wires, depending upon the embodiment of the electrical connector 202.

Figure 14:
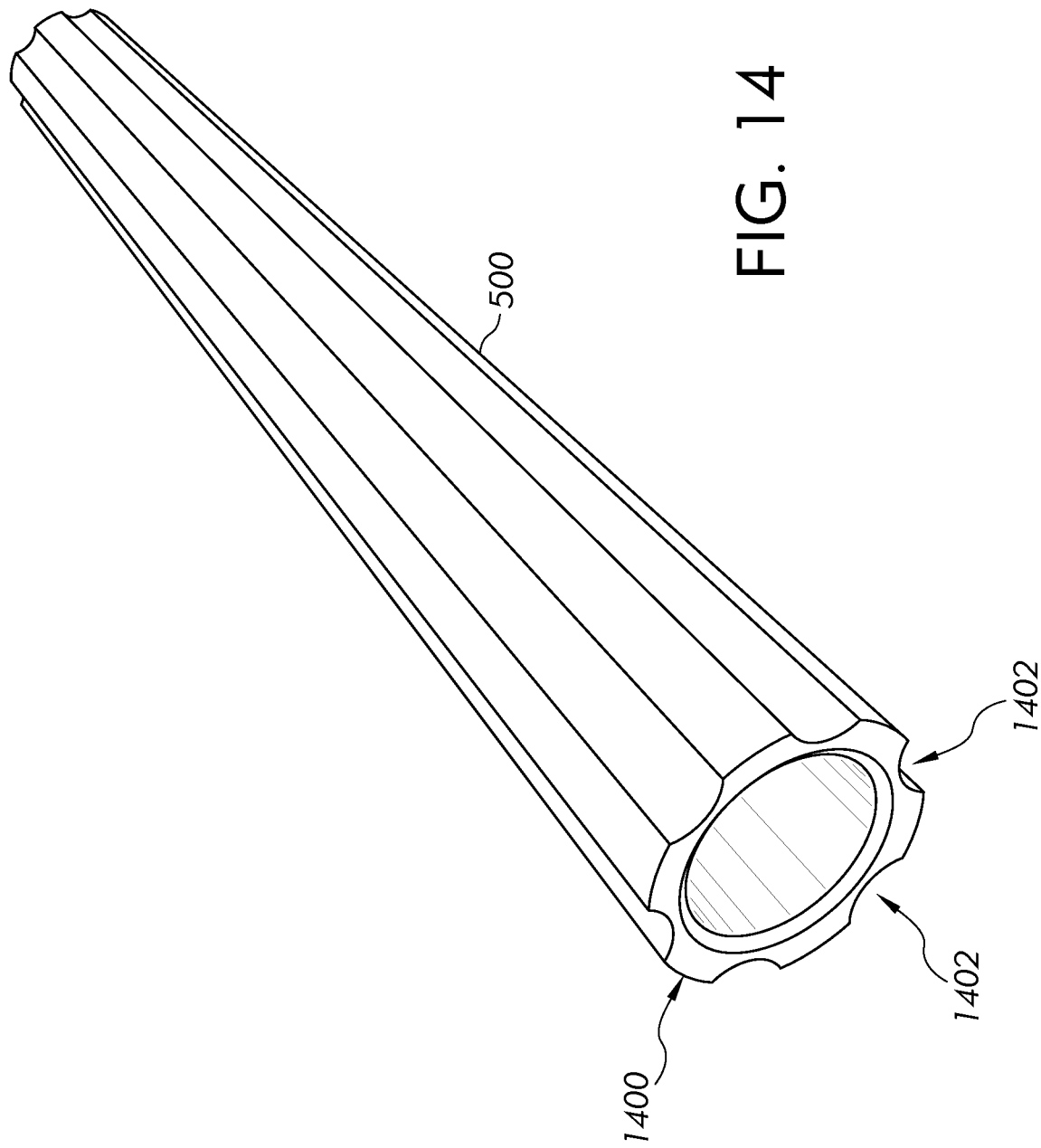
FIG. 14 is a detail view of an insert having longitudinal grooves.

Referring to FIG. 14, one example of the insert 500 is shown. In this example, the insert 500 includes an exterior surface 1400 defining longitudinal grooves 1402 along an axial length of the insert 500. The insert 500 comprises a second composition material, for example, aluminum. Relating back to the clocking feature shown in FIG. 9, the clocking can be beneficial, as a compression device with jaws 1000 as shown in FIG. 10 can be more effective if it applies force at the high points along the exterior surface 1400 of the insert 500, and not the low points of the longitudinal grooves 1402.

In some examples, the annular cylinder (e.g., insert 500) comprises a helical arrangement of extruded material. In one particular example, the annular cylinder is composed of eleven separate strands of aluminum wound in a helix arrangement. In some examples, the annular cylinder can be of various shapes, designs, etc., not just helical. Some examples can include a mesh similar to metal woven fabric, or screens.

Presently, a method of making a compression connector assembly using an electrical connector will be discussed. The components described above can be used to form a compressed assembly. The method includes the step of inserting the compression device into the through hole of the outer tube. As described above, the two components can be joined through a threaded connection. An installer then continues the method by removing a length of a top wire row from an end of the associated electrical conductor to expose the core and the base row of wires at the end of the associated electrical conductor.

Then, the installer inserts the core and the base row of wires into the aperture of the compression device. After the core and the base row of wires have been inserted to the desired length within the aperture, the method then includes radially compressing a length of the outer tube in order to radially compress the outer tube, the compression device, the base row of wires, and the core. In this process, as noted above, the outer tube, the compression device, the base row of wires, and the core form a unified group such that the associated electrical conductor cannot be removed from the outer tube and the compression device.

In this compressed assembly, the compressed assembly is contiguous with a second portion of the base row of wires and a second portion of the core of the associated electrical conductor. For the purposes of this disclosure, the term contiguous is meant to include the concept of being continuous. In other words, the compressed assembly, by including the base row of wires in the compression process, the compressed assembly is physically connected through the base row of wires to the associated electrical conductor;

there is no separation between the two. In this way, the compressed assembly and the electrical conductor are monolithic, or one piece.

It is to be understood that the described apparatus and method simplifies the design of such dead-end connectors or electrical connectors by only using a steel outer compression sleeve and the conductor itself and compressing them together. The core and base row of wires (e.g., aluminum wires) around the core are used in the compressing fitting. The installer will cut back all the layers on top of the base layer of aluminum to set a grip length. This length is then installed in the steel fitting. The steel fitting is then compressed at the first end reducing the ratio of steel and aluminum filler material between the core and compression fitting. The steel fitting is designed with an overflow chamber or aluminum expansion chamber for excess extruded aluminum to move into as the compression operation continues toward the end of the conductor. Compressing toward the open end of the core allows for the core to slightly shift, instead of binding, and this allows the aluminum strands to extrude at their own rate.

As a brief summary, the described apparatus and methods use the base, extruded layer of aluminum wire or strands formed in place by a conductor manufacturer or an interlocked, helically extruded bundle of trapezoidal wires as the filler between the core and steel compression. By using the extruded material already in place, the installer has the tightest fit around the core so that occurrences of uneven compressions are reduced or eliminated. Additionally, the shape of the strands and the configuration of individual strands keeps the compression uniform to allow the strands to extrude as necessary. Because the strands are attached to the conductor, this ensures that the filler is seated properly on the core and does not shift during installation. Because the strands are extruded, there is no burr or machine edge to damage or cut the core during compression. Additionally, compressing away from the conductor, the stress on the free end of the core is reduced. This direction of compression also eliminates an issue called "birdcaging" when the aluminum extrudes into other sections of aluminum.

In a further description of the compressed assembly, the compressed assembly includes a first portion of a base row of wires and a first portion of a core of an associated electrical conductor received within an aperture defined within a first end of a compression device that extends along a compression device axis between the first end and a second end. The first portion of the base row of wires is compressed and is contiguous with a second portion of the base row of wires that is not compressed, and the first portion of the core is contiguous with a second portion of the core.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations described should not be construed to imply that these operations are necessarily order dependent. Alternative ordering will be appreciated having the benefit of this description. Further, it will be understood that not all operations are necessarily present in each embodiment provided herein. Also, it will be understood that not all operations are necessary in some embodiments.

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first component and a second component generally correspond to component A and component B or two different or two identical components or the same component.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally to be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to "comprising".

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. An electrical connector comprising:
   a compression device extending along a compression device axis between a first end and a second end, wherein the first end defines an aperture and is configured to receive a first portion of a base row of wires and a first portion of a core of an associated electrical conductor within the aperture, wherein the first portion of the base row of wires is in direct contact with an inner sidewall of the first end of the compression device defining the aperture; and
   an outer tube extending along an outer tube axis between a first outer tube end and a second outer tube end, wherein the outer tube defines a central through hole and is configured to receive the compression device within the central through hole, wherein:
   the first outer tube end of the outer tube is configured to be compressed around the first end of the compression device, the first portion of the base row of wires, and the first portion of the core of the associated electrical conductor to create a compressed assembly, and the compressed assembly is contiguous with a second portion of the base row of wires and a second portion of the core of the associated electrical conductor.

2. An electrical connector comprising:
a compressed assembly, comprising:
a first portion of a base row of wires and a first portion of a core of an associated electrical conductor received within an aperture defined within a first end of a compression device that extends along a compression device axis between the first end and a second end, wherein:
the first portion of the base row of wires is in direct contact with an inner sidewall of the first end of the compression device defining the aperture and is compressed and is contiguous with a second portion of the base row of wires that is not compressed, and the first portion of the core is contiguous with a second portion of the core.

3. An electrical connector comprising:
a compression device extending along a compression device central axis between a first end and a second end, wherein:
the first end has an inside diameter and an outside diameter, and
the inside diameter approximates an outside diameter of a base row of wires of an associated electrical conductor such that the base row of wires is received within an aperture defined within the first end and is in direct contact with an inner sidewall of the first end;
an outer tube defining a central through hole configured to allow a portion of the compression device to be placed within the outer tube, wherein:
a length of the outer tube is configured to be compressed around the first end, the base row of wires, and a core of the associated electrical conductor such that after compression the associated electrical conductor is locked within the compression device such that the compression device supports the associated electrical conductor between electrical support devices.

4. The electrical connector according to claim 3, wherein the second end includes a loop.

5. The electrical connector according to claim 3, wherein the aperture is cylindrical.

6. The electrical connector according to claim 3, wherein the aperture is blind.

7. The electrical connector according to claim 3, wherein the aperture is centered about the compression device central axis.

8. The electrical connector according to claim 3, wherein the base row of wires does not fill a portion of the aperture when the base row of wires is received within the aperture.

9. The electrical connector according to claim 3, wherein the compression device comprises a material having a hardness that is greater than a hardness of the base row of wires.

10. The electrical connector according to claim 3, wherein the compression device comprises steel and the base row of wires comprises aluminum.

11. The electrical connector according to claim 3, wherein the base row of wires comprises extruded circular profile wires.

12. The electrical connector according to claim 3, wherein the base row of wires comprises extruded trapezoidal profile wires.

13. A method of making a compression connector assembly using the electrical connector according to claim 1 comprising:
inserting the compression device into the central through hole of the outer tube;
removing a length of a top wire row from an end of the associated electrical conductor to expose the first portion of the core and the first portion of the base row of wires at the end of the associated electrical conductor;
inserting the first portion of the core and the first portion of the base row of wires into the aperture of the compression device such that the first portion of the base row of wires is in direct contact with the inner sidewall of the first end of the compression device; and
applying a radial compression force to a length of the first end of the outer tube in order to radially compress the outer tube, the compression device, the first portion of the core, and the first portion of the base row of wires such that the outer tube, the compression device, the base row of wires, and the core form a unified group such that the associated electrical conductor cannot be removed from the outer tube and the compression device.

14. An electrical connector comprising:
a compression device extending from a first end to a second end along a compression device central axis, wherein the first end defines a first aperture;
an annular cylinder configured to be received within the first aperture, the annular cylinder having a shoulder that restricts a degree to which the annular cylinder is received within the first aperture, the annular cylinder defining a second aperture configured to receive a core of an associated electrical conductor; and
an outer tube defining a central through hole configured to receive a portion of the compression device.

15. The electrical connector according to claim 14, comprising a clocking feature to facilitate alignment between the annular cylinder and the compression device.

16. The electrical connector according to claim 15, wherein the clocking feature comprises a tab that cooperates with a void.

17. An electrical connector comprising:
a compressed assembly, comprising:
a first portion of a core of an associated electrical conductor received within a longitudinal passage defined within an annular cylinder which is received within an aperture defined within a first end of a compression device that extends along a compression device axis between the first end and a second end; and
an outer tube defining a central through hole configured to receive the compression device within the central through hole, the central through hole having an inside diameter that is less than an outside diameter of a top row of wires of the associated electrical conductor, wherein:
the first portion of the core is contiguous with a second portion of the core, and
the annular cylinder defines longitudinal grooves along an axial length of the annular cylinder.

18. An electrical connector comprising:
a compression device extending from a first end to a second end along a compression device central axis, wherein:
the first end defines a first aperture, and the compression device comprises a first composition material;

an annular cylinder configured to be received within the first aperture, wherein:
the annular cylinder defines a second aperture configured to receive a core of an associated electrical conductor, and the annular cylinder comprises a second composition material; and
an outer tube defining a central through hole configured to receive a portion of the compression device,
wherein a length of the outer tube is configured to be compressed around the first end, the annular cylinder, and the core of the associated electrical conductor to form a compressed assembly such that the first composition material and the second composition material extrude axially at different rates and such that the compressed assembly locks the associated electrical conductor within the compression device such that the compression device supports the associated electrical conductor between electrical support devices.

19. The electrical connector of claim 1, wherein the associated electrical conductor comprises a top row of wires having a first diameter, the first diameter before the outer tube is compressed is equal to the first diameter after the outer tube is compressed.

20. The electrical connector of claim 1, wherein the compression device comprises at least one of circumferential ridges or threads to tailor a mechanical property of attachment of the compression device to the outer tube.

* * * * *